United States Patent [19]

Mindler

[11] Patent Number: 4,632,737
[45] Date of Patent: Dec. 30, 1986

[54] ELECTROLYTIC REDUCTION OF NITRATE FROM SOLUTIONS OF ALKALI METAL HYDROXIDES CONTAMINATED BY OXIDIZING TRANSITION METAL IONS

[75] Inventor: Albert B. Mindler, Princeton, N.J.

[73] Assignee: International Hydronics Corporation, Rocky Hill, N.J.

[21] Appl. No.: 834,538

[22] Filed: Feb. 28, 1986

[51] Int. Cl.$^4$ ................................................ C25B 1/14
[52] U.S. Cl. ...................................... 204/98; 204/129
[58] Field of Search ................................ 204/98, 129

[56] References Cited

U.S. PATENT DOCUMENTS 3,542,657  11/1970  Mindler et al. ..................... 204/98

Primary Examiner—R. L. Andrews
Attorney, Agent, or Firm—Omri M. Behr

[57] ABSTRACT

Alkali metal hydroxide solutions containing substantial amounts of nitrate and nitrite which are contaminated by chromate are electrolytically converted to the corresponding hydroxides. The interference of the chromate with the normal electrolytic process is voided by adding bismuth ion to the solution and reversing the current direction at predetermined intervals.

15 Claims, 4 Drawing Figures

FIG.2
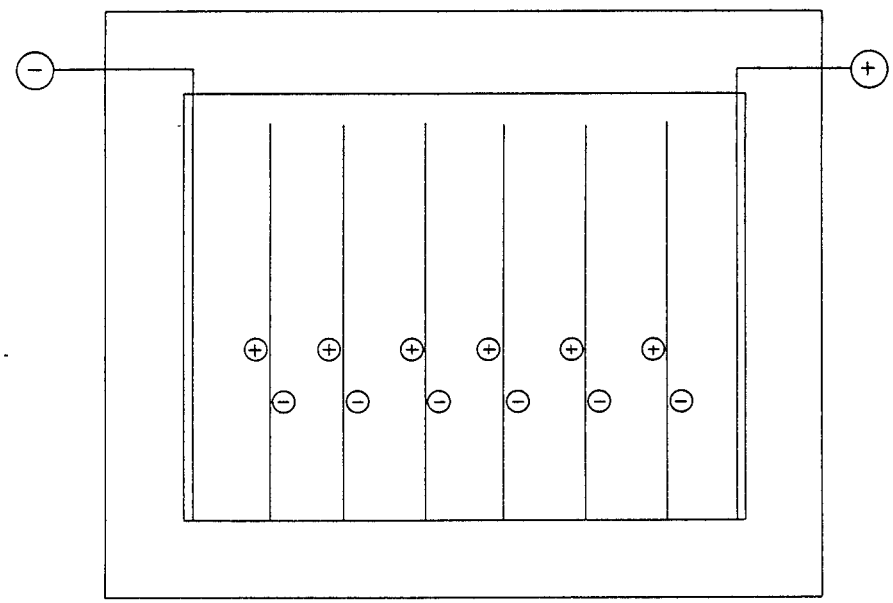
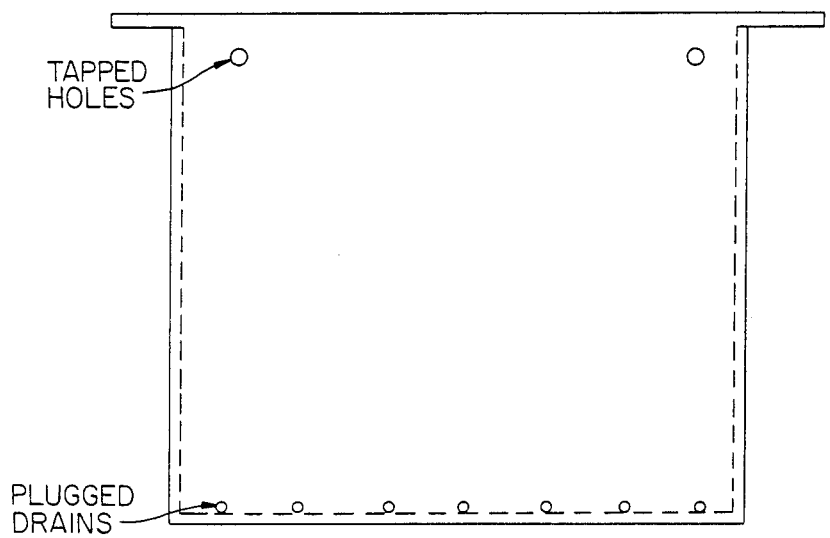

ELECTROLYTIC REDUCTION OF NITRATE FROM SOLUTIONS OF ALKALI METAL HYDROXIDES CONTAMINATED BY OXIDIZING TRANSITION METAL IONS

BACKGROUND OF THE INVENTION

It is known to electrolytically reduce nitrate and nitrite from solutions of alkali metal hydroxides. This procedure is disclosed in U.S. Pat. No. 3,542,657 to Mindler and Tuwiner, the disclosure of which is incorporated herein by reference.

It has recently been found that this procedure is inoperative when the solution of nitrate and nitrite in sodium hydroxide is contaminated with oxidizing transition metal ions such as chromium ion. The chromium contamination which will give rise to this interference may be as low as 60 parts per million (as $Na_2CrO_4$).

The reason for this interference is that in the electrolysis, nitrate is reduced to a nitrite at the cathode:

$$NO_3^- + 2H \rightarrow NO_2^- + H_2O \qquad (I)$$

However, the presence of chromate proximate to the cathode will reverse this reaction:

$$2NO_2^- + CrO_4^{--} \rightarrow 2NO_3^- + CrO_2^- \qquad (II)$$

at the anode the chromate is reoxidized:

$$CrO_2^- + 2O \rightarrow CrO_4^{--} \qquad (III)$$

here, a trace of chromate will, as found, make the prior art process inoperative.

It is generally known that bismuth will react with chromate to form a water insoluble pearlescent pigment compound. When it was first found that the chromium interfered with the regular process of the prior art procedure, it was attempted to remove the chromium by reacting the same with bismuth ion.

$$4CrO_4^{--} \rightarrow 2Cr_2O_7^{--} + O_2 \qquad (IV)$$

$$O_2 + 2Bi^{+++} + Cr_2O_7^{--} \rightarrow (BiO)_2Cr_2O_7 \qquad (V)$$

The expected precipitation of the bismuth/chromium compound did not occur although a temporary operability of the process, for a very brief period of time, was noted.

It is furthermore known that when bismuth ion is subjected to electrolysis in an aqueous medium, black metallic bismuth will be formed on the cathode and purple/brown bismuth pentoxide (which is an insulator) is formed on the anode.

SUMMARY OF THE INVENTION

It has been found that where solutions of nitrate in caustic solution are contaminated with oxidizing transition metal ions such as chromium ion and thus cannot be subjected to the conventional electrolytic reduction of U.S. Pat. No. 3,542,657, the procedure can be made operable by adding a small amount of bismuth ion, suitably but not minimally 250 parts per million by weight of the entire solution and, preferrably periodically reversing the direction of direct current flow.

In the operation of the process, a black metallic coating of bismuth is formed on the cathode and a purple/brown bismuth pentoxide is formed on the anode:

$$Bi^{+++} + 3e \rightarrow Bi \downarrow \text{ (cathode)} \qquad (VI)$$

$$2Bi^{+++} + 5O \rightarrow Bi_2O_5 + 4e \text{ (anode)} \qquad (VII)$$

During current reversal the bismuth is sloughed off from the cathode and some is converted to bismuth pentoxide on the new anode surface:

$$2Bi + 5O \rightarrow B_2O_5 + 10e \text{ (new anode)} \qquad (VII)$$

$$Bi \rightarrow Bi^{+++} + 3e \text{ (new anode)} \qquad (IX)$$

$$Bi_2O_5 + 10e \rightarrow 2Bi + 5O \text{ (new cathode)} \qquad (X)$$

$$BiO_3^- + 5e + 6H \rightarrow Bi + 3H_2O \text{ (new cathode)} \qquad (XI)$$

At the same time some of the bismuth pentoxide which was on the anode is solubilized to sodium bismuthate and the remainder reduced to metallic bismuth on the new cathode.

$$Bi_2O_5 + 2NaOH \rightarrow 2NaBiO_3 + H_2O$$

At the end of the procedure a small amount of sludge is noted, which is mainly bismuth metal and bismuth pentoxide, but also contains nickel and chromium.

At the end of the electrolytic procedure, the remaining solution contains some traces of chromium since a yellow tinge was noted.

The reason why this procedure avoids the chromate reoxidation of nitrite to nitrate is not understood. Some reductive action by the metallic bismuth is probably involved since, as stated above, the sludge contains some black bismuth metal and chromium and after standing after the end of the process, the residual yellow tinge eventually disappears indicating some form of reductive action. Thus, the process is surprising and unexpected in its result.

BRIEF DESCRIPTION OF THE DRAWINGS

FIG. 2 is an exploded elevational crossectional partial schematic representation of another embodiment of the present invention showing a bipolar cell.

It should be noted that since the calculations are based upon efficiency on an ammonia basis rather than other bases, efficiencies exceeding 100% are possible. Much of the gas involved is nitrogen. Ammonia and nitrogen are products of the decomposition of hydroxylamine, which is manufactured by electrolysis of nitrate; it is very likely an intermediate product.

DESCRIPTION OF THE PREFERRED EMBODIMENTS

Figure 1:
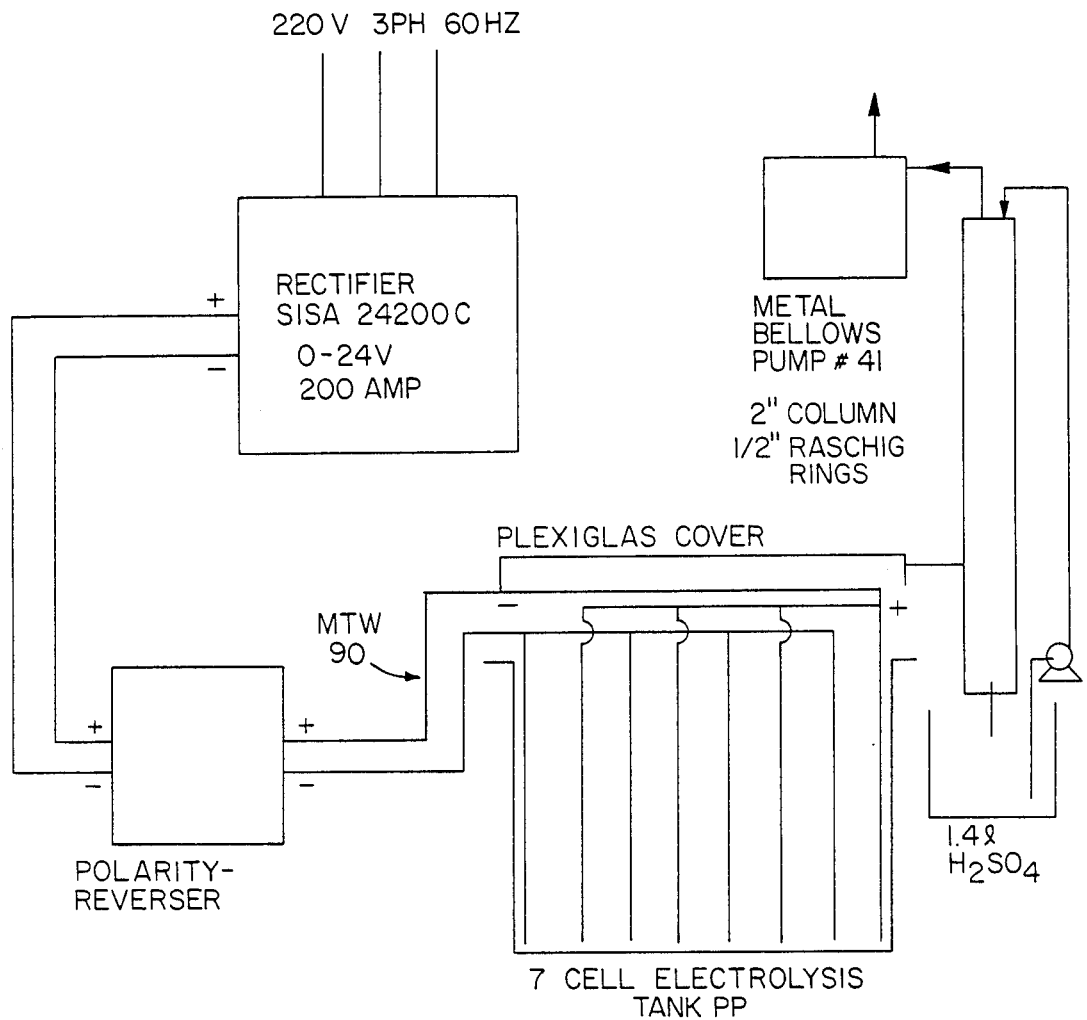
FIG. 1 is a schematic representation of an embodiment of the present invention.

The process of the present invention is carried out as illustrated in FIG. 1 in a substantially conventional electrolysis tank having one or more plates of nickel connected to one pole of a direct current source and a similar number of plates connected to a direct current source of opposite polarity. Intermediate between the direct current source and the plates of the cell there is provided a polarity reversor of conventional construction which may be set to reverse the polarity either manually or automatically at a predetermined period. The outlet gases from the cell contain a mixture of ammonia, nitrogen, and oxygen. The ammonia may, if desired, be scrubbed out in a conventional acid containing scrubber or it may be collected and liquified, equally in a conventional manner.

In one embodiment of the invention, in place of utilizing a cell with the plates of a given polarity connected in parallel as shown in the drawing of FIG. 1, there may equally be used a bi-polar cell as illustrated in FIG. 2.

The substrate upon which the process is carried out is an industrial waste product. Therefore, it will have varying amounts of components. The substrate solutions comprise water, nitrate, hydroxide, and oxidizing transition metal ion, usually chromium ion. The amount of nitrate in the initial solution may be between 5 and 30% by weight, usually it will be about 15 to 20% by weight and the amount of hydroxide will be between 2 and 25%, usually about 5% (initial). The process is operative whatever the ratio of these two components may be. The water content is usually between 50 and 80%. The amount of chromium contamination may of course vary, however, it has been found that a chromium contamination of the order of 60 parts per million is sufficient to inihibit the conventional Mindler and Tuwiner process. In order for the invention to be operative, a sufficient amount of bismuth must be added to permit the optically detectable presence of bismuth pentoxide on an anode during the operation of the process. While there appears to be no upper limit (other than solubility) for bismuth to be present in the solution, it has been found that the process is always operative using an amount of bismuth which would, in theory, react with the amount of chromium or other oxidizing transition metal ion known to be present and form bismuth chromate or the like, (which of course is not formed). For a solution which contains 60 parts per million of chromium, it has been found that this criterium is satisfied by the use of 250 parts per million of bismuth ion. It should be stressed that this amount is a known operative amount and should under no circumstances be considered to be a limiting amount, either as a maximum or a minimum. The bismuth may be added as sodium bismuthate, bismuth nitrate or bismuth subnitrate. The subnitrate submicro particles are produced by diluting the nitrate and neutralizing with dilute ammonium hydroxide.

In the operation of the process the applied voltage across the plates of the cell will lie between about 2 to about 4 volts, generally it has been found that the actual voltage between the plates is between about 2.5 and about 3.5 volts. The current flowing will generally be of the order of 10 to 20 amps, usually about 15 amps. The bath temperature will also vary between about 35° and about 90° C. A temperature range of between about 70° and about 85° C. being generally preferred. The time between current direction reversal can be anywhere from 2 minutes to about 30 hours. It is preferred to operate the the process on a reversal schedule of between about 2 to about 5 minutes. If the time period in a given direction is substantially shorter than 2 minutes efficiency is impaired because the time is insufficient to permit the bismuth to be "deplated" from the cathode on the one hand and the bismuth pentoxide to be sloughed off or redissolved from the anode. On the other hand, if the time period is too long, the bismuth pentoxide which is an insulator, will substantially insulate the anode, thus cutting down the efficiency of current flow.

All experiments reported herein were carried out on a simulated decontaminated salt solution, whose composition is set forth below in Table 1.

TABLE 1

| Simulated Decontaminated Salt Solution (SDSS) | |
|---|---|
| COMPONENT | WEIGHT %[1] |
| $H_2O$ | 68.7 |
| $NaNO_3$ | 15.6 |
| NaOH | 4.2 |
| $NaNO_2$ | 3.9 |
| $NaAl(OH)_4$ | 3.6 |
| $Na_2SO_4$ | 1.9 |
| $Na_2CO_3$ | 1.7 |
| $Na_3PO_4$ | 0.13 |
| NaCl | 0.12 |
| $Na(C_6H_5)_4BO_3$ | 0.05 |
| $NaSiO_3$ | 0.007 |
| $Na_2CrO_4$ | 0.006 |
| NaF | 0.004 |
| $Na_2MoO_4$ | 0.004 |
| NaHgO(OH) | $2.4 \times 10^{-6}$ |

[1]Nominal weight percent.

RUN 1

This run is tabulated on Table 2 below and comprises the electrolysis of an SDSS solution as set forth above without the chromium contaminant. This is added after neutralization with nitric acid and restart. This run shows that the prior art method of Mindler and Tuwiner gives a current efficiency of approximately 70% when free of chromium. This efficiency drops to 26.5% when chromium is added.

TABLE 2

| Electrolysis Data Area of Electrodes 0.3 sq. ft. | | | | | | | |
|---|---|---|---|---|---|---|---|
| Hrs. | Volts | Amps | Amp Hrs. | Cum. Amp Hrs. | OH CE % | Temp. °C. | Remarks |
| Synthetic $NaNO_3$/NaOH - 1.8 liters 1,81 N $OH^-$; 2.2 N $NO_3^-$ | | | | | | | |
| | 3.5 | 15 | 0 | 0 | | | Start - NO $CrO_4^=$ |
| | 2.8 | 15 | 45 | | | 38 | |
| 22 | 2.5 | 10 | 358 | 358 | 73.5 | 52 | |
| 50 | 2.5 | 10 | 334 | 692 | 66.7 | 52.5 | |
| | | | | Overall CE | 70.0 | | |
| Neutralize with acid and add 60 ppm $Na_2CrO_4$ | | | | | | | |
| | 2.6 | 15 | 0 | 0 | | 58 | Start |
| | 3.0 | 19 | 350 | 350 | 5.6 | 82 | |
| | 2.5 | 15 | 142 | 492 | 14.8 | 71 | |
| | 2.6 | 10 | 194 | 686 | 35.0 | 45 | |
| | | | | Overall CE | 26.5 | | |

RUN 2

This long scale run of SDSS solution shows an overall current efficiency of 11% in Table 3.

The run as made with 1.8 l of SDSS containing 60 ppm $Na_2CrO_4$ by weight in a single cell with 0.3 sq.ft. each cathode and anode surface exposed, spaced 2 inches apart.

TABLE 3

| Hrs. | Volts | Amps | Amp Hrs. | Cum. Amp Hrs. | OH CE % | Temp. °C. | Remarks |
|---|---|---|---|---|---|---|---|
| | 2.2 | 1.5-5.0 | 4 | | | | Start NaNO$_2$ is 18.1% - 2.12 N |
| | 3.2 | 11.8 | 24 | 28 | | 31 | Shut Down |
| 22 | 3.7 | 12.0 | 36 | 64 | | 50 | Restart |
| | 2.6 | 6.0 | 36 | 100 | | 40 | |
| | 2.7 | 6.1 | — | | | | |
| 46 | 2.8 | 6.0 | 150 | 250 | | 39 | |
| 57 | 2.8 | 5.6 | 150 | 400 | | 36 | |
| 76 | 2.8 | 5.7 | 114 | 514 | 18 | 37 | |
| 95 | 3.2 | 15 | 225 | 739 | | 57 | |
| 116 | 3.5 | 12 | 252 | 991 | | 48 | |
| 140 | 3.2 | 15 | 345 | 1336 | 18.1 | 44 | |
| 171 | 3.0 | 13 | 400 | 1736 | | | |
| 195 | 3.0 | 15 | 252 | 1986 | | | |
| 218 | 2.1 | 4/2.5 | 68 | 2054 | | | |
| 239 | 2.4 | 5.0 | 105 | 2159 | | 32 | NaOH 2.62 N |
| | | | Overall CE | | 13.0 | | |
| 0 | 3.1 | 15 | | 2159 | | | Replace ⅔ of bath with 15% NaOH |
| 6 | 2.8 | 12 | | | | 45 | NaOH 3.86 N |
| 21 | 2.8 | 12.5 | 288 | 2447 | 43 | 40 | Add PE Beads to reduce mist |
| 45 | 2.8 | 13 | 312 | 2759 | 14.2 | 47 | |
| | 2.8 | 15 | | | | 47 | |
| | 3.0 | 15 | 360 | 3119 | | 45 | NaOH 4.09 N |
| | | | Overall CE | | 9.2 | | |
| | | | Effect of Bismuth Addition: | | | | |
| 69 | 2.9 | 15 | | 3119 | | 54.5 | Add 400 mg NaBiO$_3$ OH$^-$ 4.13 N |
| | 2.6 | 15 | | | 93 | 63.5 | Shut down |
| 93 | 2.5 | 14.5 | 360 | 3479 | 111 | 57 | NaOH 4.89 N |
| | | | Overall CE | | 81.5 | | |

The effectiveness of bismuth in promoting the electrolytic reduction of nitrate to nitrogen and ammonia may be shown in terms of milliequivalents of hydroxyl ion produced per 100 ampere hours. Thus, for the first 2159 amp hrs., 33.8 meq/100 amp hrs. resulted. For the next 960 amp hrs., 43.1 meq/100 amp hrs. was produced. After adding 400 mg sodium bismuthate, the next 360 asmpere hrs. produced 380 meq/100 amp hrs.

(466 meq OH$^-$ is equal to 100% current efficiency).

RUN 3

Shows a cumulative run of 1,020 ampere hours on 1.8 liters SDSS solution containing 100 milligrams of bismuth showing an overall current efficiency of 94.6%.

TABLE 4

| Hrs. | Volts | Amps | Amp Hrs. | Cum. Amp Hrs. | OH CE % | Temp. °C. | Remarks |
|---|---|---|---|---|---|---|---|
| 0 | 3.5 | 15 | 0 | 0 | — | — | NaOH 1.99 N |
| 2 | 3.3 | 15 | — | — | — | | |
| 17.5 | 2.8 | 15 | 241 | 241 | 115 | | |
| 4.5 | 2.8 | 15 | 68 | 309 | 131 | | |
| 3.5 | 2.8 | 15 | 53 | 362 | 86 | 79 | |
| 15.5 | 2.8 | 15 | 232 | 594 | 73 | 81 | Add 100 mg Bi |
| 5.5 | 2.8 | 15 | 82 | 676 | 84 | 76 | |
| 3 | 2.8 | 15 | 45 | 721 | 103 | — | |
| 16 | 2.7 | 16 | 256 | 977 | 89 | 84 | |
| 3.5 | 2.7 | 16 | 43 | 1020 | 90 | 74 | Stop - OH$^-$ 4.49 N |

441 meq. OH$^-$ produced per 100 amp hrs.

RUN 4

Shows a 1558 ampere hour run showing current reversal after 151, 566, 686, 746, and 1296 hours, given overall current efficiency of 87.8%.

TABLE 5

| Hrs. | Volts | Amps | Amp Hrs. | Cum. Amp Hrs. | OH CE % | Temp. °C. | Remarks |
|---|---|---|---|---|---|---|---|
| 0 | 5.8 | 30 | 0 | 0 | — | 20 | Start - OH$^-$ 2.16 N 1.8 liters |
| 1.25 | 4.2 | 30 | 38 | 38 | 408 | 70 | 1.3 × Theory Bi$^{++}$ |
| 3.75 | 3.8 | 30 | 113 | 151 | 85 | 89 | Reverse current |
| 4.25 | 3.5 | 30 | 105 | 256 | 169 | 101 | |
| 10.25 | 3.5 | 29–30 | 310 | 566 | 46 | 98 | " |
| 2 | 3.4 | 30 | 60 | 626 | 103 | — | |
| 2 | 3.4 | 30 | 60 | 686 | 0 | — | Reverse current |
| 2 | 3.4 | 31–30 | 60 | 746 | 71 | — | Reverse 15 min. |
| 2 | 3.1 | 30 | 60 | 806 | 136 | 93 | |
| 5.50 | 3.3 | 30 | 175 | 981 | 97 | 98 | |
| 10.50 | 3.5 | 30 | 315 | 1296 | 81 | 99.5 | " |

TABLE 5-continued

| Hrs. | Volts | Amps | Amp Hrs. | Cum. Amp Hrs. | OH CE % | Temp. °C. | Remarks |
|---|---|---|---|---|---|---|---|
| 10.50 | 3.0 | 30-20 | 262 | 1558 | 110 | 80 | Stop - OH$^-$ 6.89 N 1.44 liters |

409 meq OH$^-$ produced per 100 amp hrs.

RUN 5

Figure 3:
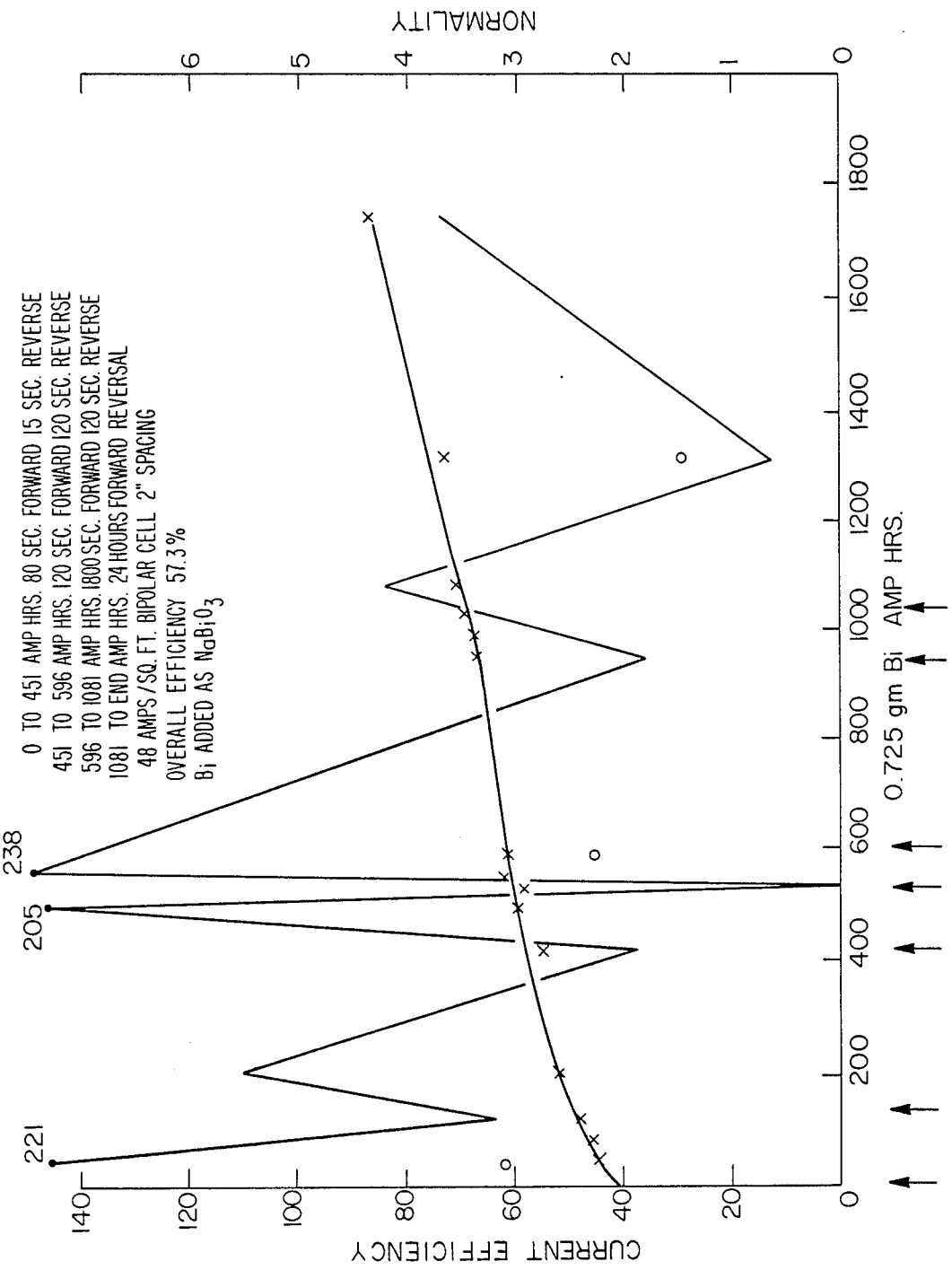
FIG. 3 is a plot of percentage currency efficiency on an ammonia basis against amp hours of an experimental run in accordance with the present invention.

This run is illustrated by Table 6 and FIG. 3. Different rates of current reversal were utilized. 49 amps/sq.ft. bipolar mode seven cells 2" spacing. Overall efficiency 57.3%. 5.075 gms. Bi added as NaBiO$_3$.

TABLE 6

| Current Reversal | | |
|---|---|---|
| 0 to 451 Amp Hrs. | 80 sec. Forward | 15 sec. Reverse |
| 451 to 596 Amp Hrs. | 120 sec. Forward | 120 sec. Reverse |
| 596 to 1081 Amp Hrs. | 1800 sec. Forward | 120 sec. Reverse |
| 1081 to END Amp Hrs. | 24 hours Reversal | |

(N.B. It should be noted that while the current was reversed as stated above, analyses were only taken at the points illustrated. Therefore this figure is probably not an accurate reflection of the actual currency efficiency at a particular moment, but gives a true general indication thereof.)

RUN 6

Figure 4:
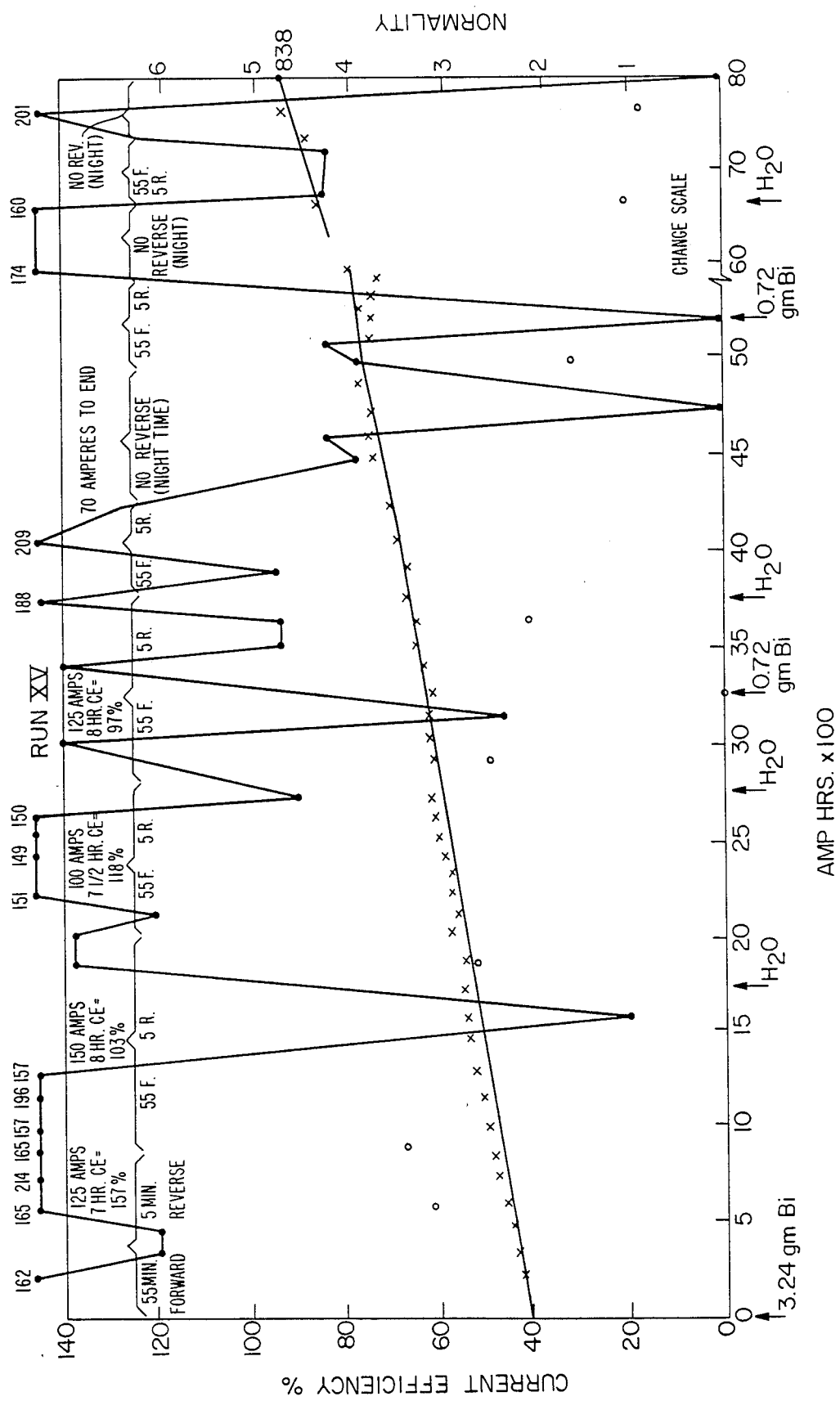
FIG. 4 is another graphical representation as for FIG. 3 of another run of the process of the present invention showing higher levels of current efficiency.

As illustrated in FIG. 4, there is shown a run in excess of 4,000 ampere hours utilizing a current pattern of 55 minutes in one direction and 5 minutes in the reverse direction.

Conclusions

It is clear from Runs 5 and 6 that the best efficiencies are obtained where the current in one direction does not exceed 55 minutes and where the reversal time is at least 120 seconds, it will be seen from Run 5 that a serious drop-off in efficiency occurs where the current flows for less than 120 seconds in any given direction. Similarly, where the current flows for 24 to 30 hours in one direction, there is also a serious drop-off in operating efficiency.

The very best efficiencies appear to be noted in bipolar cells (Run 5) with a flow time in each direction of the order of 120 seconds.

While the principle purpose of the present invention is to permit the reduction of nitrate to hydroxide in the presence of a chromium contaminant, the invention is not limited thereto. The invention would be equally operative in the presence of other multi-valent transition metals which form oxidizing anions, for example, vanadium, manganese, molybdenum and the like, although chromium, at the present time, causes the most serious industrial problems.

I claim:

1. A method of converting an aqueous solution of alkali metal nitrate or nitrite salt contaminated with a transition metal ion capable of oxidizing nitrite to nitrate, to the corresponding alkali metal hydroxide in an alkali metal hydroxide solution, in an electrolytic cell in which direct current is imposed between anodes and cathodes in said cell, thereby producing oxygen gases at said anodes and alkali metal hydroxide at said cathodes, which further comprises adding to said solution at least one equivalent of bismuth ion relative to the equivalents transition metal ion present.

2. A method according to claim 1 wherein the direction of flow of the direct current is reversed at predetermined intervals.

3. A process of claim 1 wherein there is utilized at least one equivalent of bismuth per equivalent of contaminating transition metal ion.

4. A process according to claim 1 wherein the current is caused to flow for not more than 24 hours in a given direction.

5. A process according to claim 4 wherein the current is caused to flow for not more than about 55 minutes in a given direction.

6. A process according to claim 5 wherein the current is caused to flow for not more than 5 minutes in the opposite direction and thereafter is reversed to flow in the initial direction.

7. A process in accordance with claim 6 wherein the current is caused to flow for no more than 120 seconds in either direction.

8. A method according to claim 1 in which the current density is between 5 and 100 amperes per square foot of wetted cathode area.

9. A method according to claim 1 in which the anodes and cathodes consist of the opposing faces of bipolar electrode sheet metal, said electrodes in vertical and parallel array defining solution-containing electrolyte cells, the imposed direct current flowing through said cells in series.

10. A method of claim 9 wherein the metal is nickel.

11. A method of claim 9 wherein the electrodes are in parallel electrical connection.

12. A method of claim 1 wherein the bismuth is added as NaBiO$_3$.

13. A method of claim 1 wherein the bismuth is added as Bi(NO$_3$).

14. A method of claim 1 wherein the bismuth is added as (BiO$_3$)OHNO$_3$.

15. A method of converting an aqueous solution of alkali metal nitrate or nitrite salt contaminated with a transition metal ion capable of oxidizing nitrite to nitrate, to the corresponding alkali metal hydroxide, nitrogen and ammonia in an alkali metal hydroxide solution, in an electrolytic cell in which direct current is imposed between anodes and cathodes in said cell, thereby producing oxygen gases at said anodes and alkali metal hydroxide, nitrogen and ammonia at said cathodes, which further comprises adding to said solution at least one equivalent of bismuth ion relative to the equivalents transition metal ion present.

* * * * *